United States Patent
Pokrass et al.

(10) Patent No.: US 10,365,358 B2
(45) Date of Patent: Jul. 30, 2019

(54) LOW LATENCY DECODING IN MULTI-INPUT MULTI-OUTPUT RADAR

(71) Applicant: GM Global Technology Operations LLC, Detroit, MI (US)

(72) Inventors: Alexander Pokrass, Bat Yam (IL); Igal Bilik, Rehovot (IL); Shahar Villeval, Tel Aviv (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 359 days.

(21) Appl. No.: 15/190,392

(22) Filed: Jun. 23, 2016

(65) Prior Publication Data

US 2017/0371030 A1 Dec. 28, 2017

(51) Int. Cl.
| | |
|---|---|
| *G01S 13/02* | (2006.01) |
| *G01S 13/32* | (2006.01) |
| *G01S 13/34* | (2006.01) |
| *G01S 13/93* | (2006.01) |
| *G01S 13/86* | (2006.01) |

(52) U.S. Cl.
CPC ........ *G01S 13/0209* (2013.01); *G01S 13/325* (2013.01); *G01S 13/343* (2013.01); *G01S 13/931* (2013.01); *G01S 13/867* (2013.01); *G01S 2013/9375* (2013.01)

(58) Field of Classification Search
CPC .. G01S 13/0209; G01S 13/325; G01S 13/343; G01S 13/931; G01S 13/867; G01S 2013/9375

USPC ........................................................ 342/132
See application file for complete search history.

(56) References Cited

U.S. PATENT DOCUMENTS

| | | | | |
|---|---|---|---|---|
| 8,305,256 B1 * | 11/2012 | Manickam | .............. | G01S 7/292 |
| | | | | 342/109 |
| 9,599,702 B1 * | 3/2017 | Bordes | .................. | G01S 13/931 |
| 9,772,397 B1 * | 9/2017 | Bordes | .................... | G01S 7/023 |
| 2012/0105268 A1 * | 5/2012 | Smits | ...................... | G01S 7/025 |
| | | | | 342/22 |
| 2017/0257865 A1 * | 9/2017 | Halabian | ............. | H04L 27/2607 |

* cited by examiner

*Primary Examiner* — Frank J McGue

(74) *Attorney, Agent, or Firm* — Cantor Colburn LLP

(57) ABSTRACT

A multi-input multi-output (MIMO) radar system and method of performing low-latency decoding in a MIMO radar system. The method includes transmitting a different linear frequency-modulated continuous wave (LFM-CW) transmit signal from each of N transmit elements of the MIMO radar system, each transmit signal associated with teach of the N transmit elements including a respective code, and receiving reflections associated with each of the transmit signals from each of the N transmit elements at each receive element of the MIMO radar system. Processing each symbol corresponding with each received reflection on a symbol-by-symbol basis is done to obtain a respective decoded signal prior to receiving all the received reflections associated with all the N transmit elements, wherein the processing includes using a Hadamard matrix with N columns in which each column is associated with the respective code transmitted by each of the N transmit elements.

12 Claims, 4 Drawing Sheets

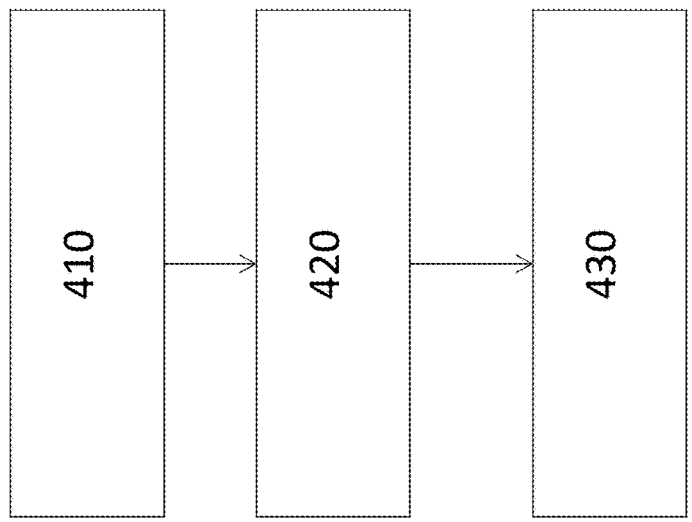

LOW LATENCY DECODING IN MULTI-INPUT MULTI-OUTPUT RADAR

FIELD OF THE INVENTION

The subject invention relates to low latency decoding in multi-input multi-output (MIMO) radar.

BACKGROUND

In a MIMO radar system, multiple co-located transmit antennas radiate and multiple receiver antennas each receive the resulting reflections associated with all the transmit antennas. For a MIMO radar system with N transmitters and K receivers, the virtual field of view is N*K. This increased virtual field of view (in comparison with the real field of view of N+K) facilitates increased spatial resolution with fewer antenna elements. Because each receiver receives reflections associated with every transmitter, the reflections at each receiver must be resolved. Transmission according to a time division multiple access (TDMA) scheme is one way to resolve the transmissions, but the maximum detectable velocity of a target may be reduced due to the time between transmissions according to the TDMA scheme. Another way to resolve the transmissions is by using code-based MIMO whereby each transmitter transmits a different code. By determining the code of a received reflection, the associated transmitter may be identified. Typically, when N transmitters have transmitted N codes, a receiver receives all N reflections before decoding the received reflections. This latency in the decoding can affect the information obtained from the reflections. Accordingly, it is desirable to provide low latency decoding in MIMO radar.

SUMMARY OF THE INVENTION

In one exemplary embodiment of the invention, a method of performing low-latency decoding in a multi-input multi-output (MIMO) radar system includes transmitting a different linear frequency-modulated continuous wave (LFM-CW) transmit signal from each of N transmit elements of the MIMO radar system, each transmit signal associated with teach of the N transmit elements including a respective code; receiving reflections associated with each of the transmit signals from each of the N transmit elements at each receive element of the MIMO radar system; and processing each symbol corresponding with each received reflection on a symbol-by-symbol basis to obtain a respective decoded signal prior to receiving all the received reflections associated with all the N transmit elements, wherein the processing includes using a Hadamard matrix with N columns in which each column is associated with the respective code transmitted by each of the N transmit elements.

In another exemplary embodiment, a multi-input multi-output (MIMO) radar system with low-latency decoding includes N transmit elements, each of the N transmit elements configured to transmit a different linear frequency-modulated continuous wave (LFM-CW) transmit signal, each transmit signal associated with teach of the N transmit elements including a respective code; a plurality of receive elements configured to receive reflections associated with each of the transmit signals from each of the N transmit elements; and a processor configured to obtain a decoded signal corresponding with each reflection, wherein the processor processes each symbol corresponding with each received reflection on a symbol-by-symbol basis to obtain a respective decoded signal prior to receiving all the received reflections associated with all the N transmit elements and the processor processes each symbol using a Hadamard matrix with N columns in which each column is associated with the respective code transmitted by each of the N transmit elements.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIG. 4 is a process flow of a method of performing low-latency decoding in a MIMO system according to one or more embodiments.

DESCRIPTION OF THE EMBODIMENTS

Figure 1:
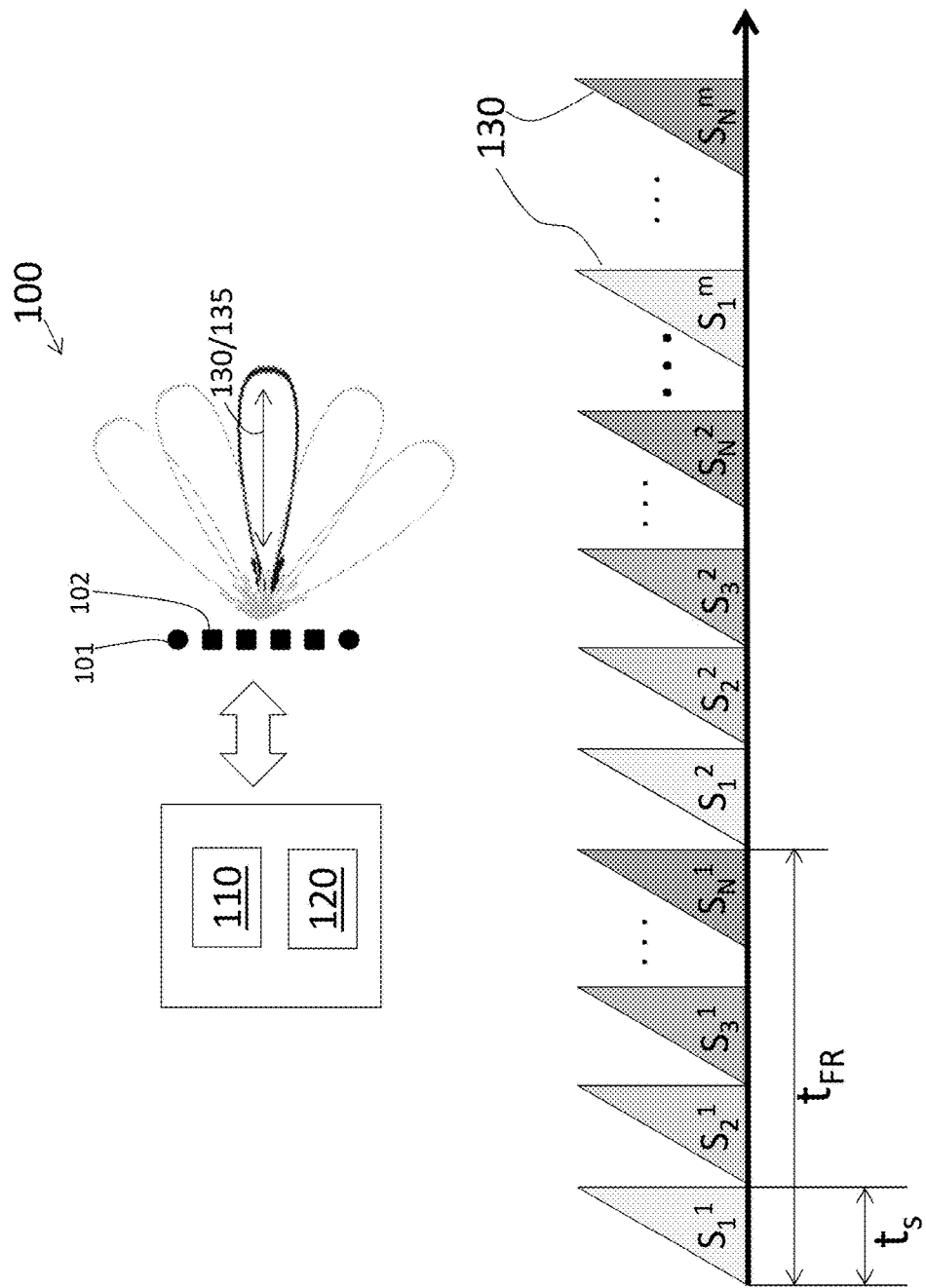
FIG. 1 shows an exemplary linear frequency modulation continuous wave (LFM-CW) multi-input multi-output (MIMO) system and resulting reflections processed according to one or more embodiments of the invention.

The following description is merely exemplary in nature and is not intended to limit the present disclosure, its application or uses. It should be understood that throughout the drawings, corresponding reference numerals indicate like or corresponding parts and features.

As previously noted, code-based MIMO radar facilitates resolving which transmitters are associated with each received reflection at each receive element. The code-based MIMO radar according to embodiments herein is a linear frequency-modulated continuous wave (LFM-CW) MIMO system. Each LFM-CW signal exhibits a different linear increase (or decrease) in frequency over the duration of the continuous wave and is referred to as a chirp. The total time duration to transmit a chirp from every transmitter is referred to as the frame duration. Generally, the reflections resulting from each of the transmissions are received and decoded together. Accordingly, while the maximum detectable range is directly proportional to the duration of each chirp, the maximum detectable velocity is inversely proportional to the frame duration. Thus, as the duration of each chirp (and, thus, the frame duration) increases, the maximum detectable range increases but the maximum detectable velocity decreases. Embodiments detailed herein relate to reducing the latency involved with decoding and, thus, addressing the reduction in maximum detectable velocity based on the frame duration. Specifically, a sliding window is defined for decoding reflections on a chirp-by-chirp basis. As a result, the maximum detectable velocity is defined by the chirp duration rather than the frame duration.

FIG. 1 shows an exemplary LFM-CW MIMO system 100 and transmitted signals 130 (chirps) processed according to one or more embodiments of the invention. The system 100 includes an array of transmit elements 101 and an array of receive elements 102. Each receive element 102 in the array receives the reflections resulting from the transmitted signals 130 of all of the transmit elements 101 of the array. The system 100 also includes one or more memory devices 110 and one or more processors 120 to generate the transmitted signals 130 and process the resulting reflections 135. This processing is further detailed with reference to FIG. 2.

The system 100 includes an array of N transmit elements 101. As previously noted, the transmitted signal 130 transmitted by each of the N transmit elements 101 is a chirp, which is a signal with a linear change in frequency over a chirp duration $t_s$. The frame interval, $t_{FR}$, is the duration to transmit the chirp from each of the N transmit elements 101. FIG. 1 illustrates m frames of N transmitted signals 130 (symbols S) each. While the transmitted signals 130 of each transmit element 101 look identical in FIG. 1 because they are shown in the frequency domain, each of the transmit elements 101 transmits a different code. Thus, the transmit element 101 associated with a given received reflection 135 may be identified based on the code.

As noted previously, each receive element 102 receives N reflections 135, each of which is a symbol S resulting from a transmitted symbol S of a period $t_s$. When reflections 135 resulting from a full frame duration $t_{FR}$ of symbols S are received by a receive element 102 before decoding, the maximal velocity is proportional to $1/t_{FR}$. With an exemplary number of transmit elements 102 N=16, the maximal velocity is proportional to $1/(16*t_s)$. The maximal velocity indicates the highest target velocity that may be determined correctly. Velocities above the maximal velocity are measured at lower velocities and targets approaching the system 100 are seen as going away from the system 100. When each symbol S is decoded as it is received (rather than waiting to receive N symbols S), then the maximal velocity is proportional to $1/t_s$. In the example in which N is 16 such that $t_{FR}$ is $16*t_s$, the maximal velocity being proportional to $1/t_s$, is sixteen times greater than the maximal velocity associated with $1/t_{FR}$ ($1/(16*t_s)$ noted above). Thus, decoding received symbols S one-at-a-time according to one or more embodiments, rather than suffering the latency of receiving all N symbols S prior to decoding, results in an increase in the maximal velocity on the order of the number of transmit elements 101.

Figure 2:
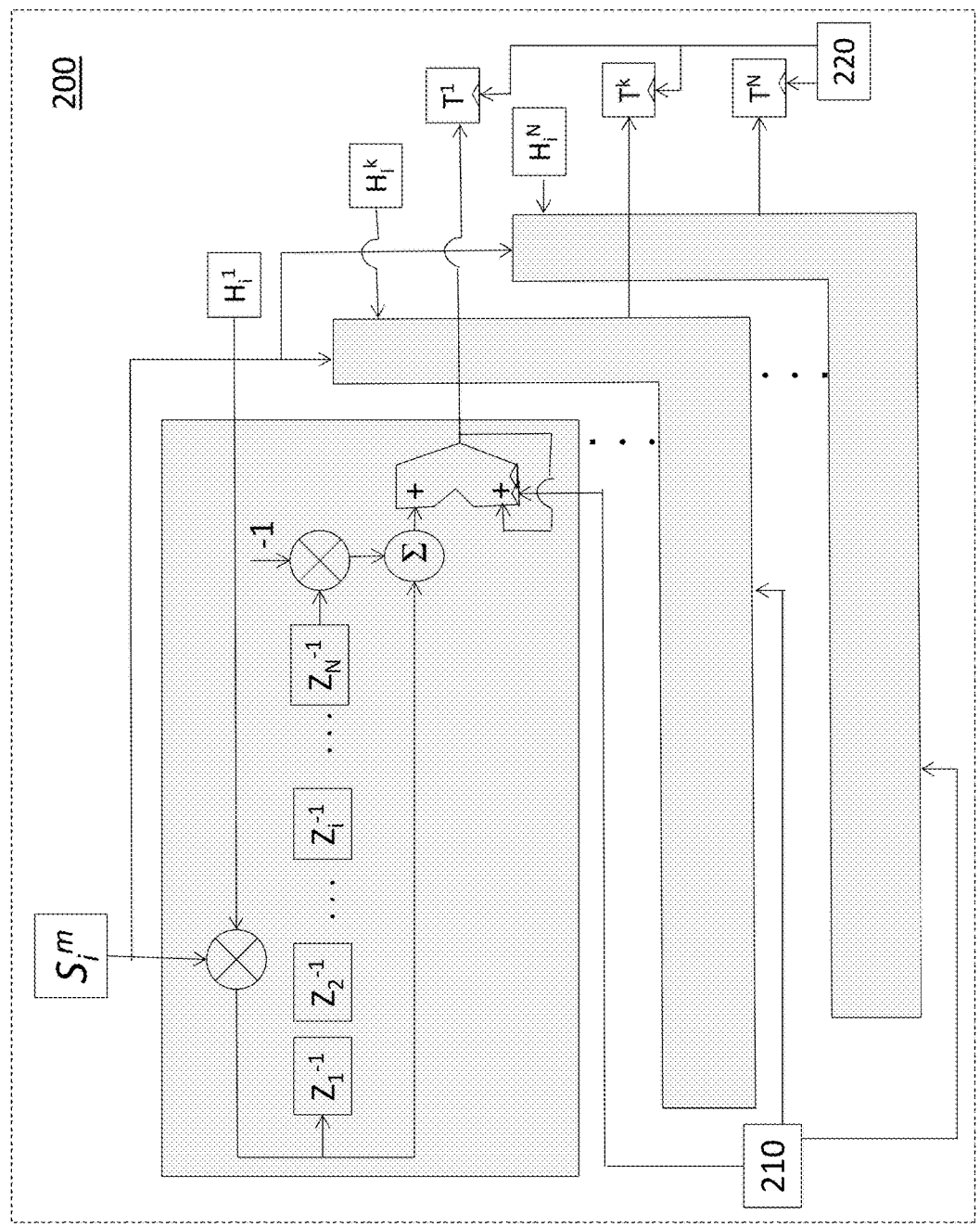
FIG. 2 is a block diagram of the processing done for each received reflection according to one or more embodiments.

FIG. 2 is a block diagram of the processing done for each received reflection 135 (symbol S) according to one or more embodiments. The processing may be implemented in hardware, software processed by the processor 120 of the system 100, firmware that is part of the system 100, or a combination thereof. The received symbol $S_i^m$ is decoded using a Hadamard matrix $H_i^k$. The Z transform ($Z_i^{-1}$) is used as a delay. The index i is the codeword index (where each code is made up of a number of codewords), the index m is the frame index, and the index k is the transmit element 101 index. Each column of the Hadamard matrix $H_i^k$ corresponds with a code transmitted by a transmit element 101 according to an exemplary embodiment. Based on the particular decoding scheme used, each column may instead be an inverse of the code, for example. Because there are N transmit elements 101, the Hadamard matrix $H_i^k$ has N such columns (k goes from 1 to N), with each column including some number (indexed by i) of rows of codewords. Decoding the received symbol $S_i^m$ means multiplying the received symbol $S_i^m$ with each column of the Hadamard matrix $H_i^k$, in turn, to obtain each processor or decoder output $T^k$. The multiplication is specifically of each codeword of the received symbol $S_i^m$ with each row (codeword) of each column of the Hadamard matrix $H_i^k$. The decoded signal is determined from among the decoder output $T^k$, as discussed below.

As shown in FIG. 2, the received symbol $S_i^m$ is multiplied by the first column of the Hadamard matrix $H_i^1$, corresponding with the code transmitted by the first transmit element 101 of the array, to obtain the first decoder output $T^1$. Generally, the received symbol $S_i^m$ is multiplied by the $k^{th}$ column of the Hadamard matrix H ($H_i^k$), corresponding with the code transmitted by the $k^{th}$ transmit element 101 of the array, to obtain the $k^{th}$ decoder output $T^k$. For a given frame m, the received symbol $S_i^m$ is lastly multiplied by the $N^{th}$ column of the Hadamard matrix H ($H_i^N$), corresponding with the code transmitted by the $N^{th}$ transmit element 101 (the last transmit element 101) of the array, to obtain the last decoder output $T^N$ for the frame. A clock signal 210 is fed to the computational unit associated with each transmit element 101. Because the multiplication is for one codeword-at-a-time (i.e., each $T^k$ is comprised of as many elements as there are codewords in each code), a value of $T^k$ is output for each clock. A write enable signal 220 is provided after N clock cycles. That is, all of the $T^k$ values for a given frame ($T^1$ to $T^N$) are computed before they are output.

The processor 120 (which may obtain or receive the $T^k$ values) determines the transmit element 101 associated with the received reflection 135 based on a comparison of the $T^k$ values. This determination is known and is based on the fact that the decoder output $T^k$ that is the decoded signal (i.e., the decoder output $T^k$ associated with the column of the Hadamard matrix $H^k$ that corresponds with the transmit element 101 that is responsible for the reflection 135) will have the highest value. As the discussion of FIG. 2 indicates, the decoding (obtaining of each $T^k$) is not delayed until N reflections 135 are obtained. This low latency decoding facilitates the above-noted increase in the maximal velocity detected by the system 100.

Figure 3:
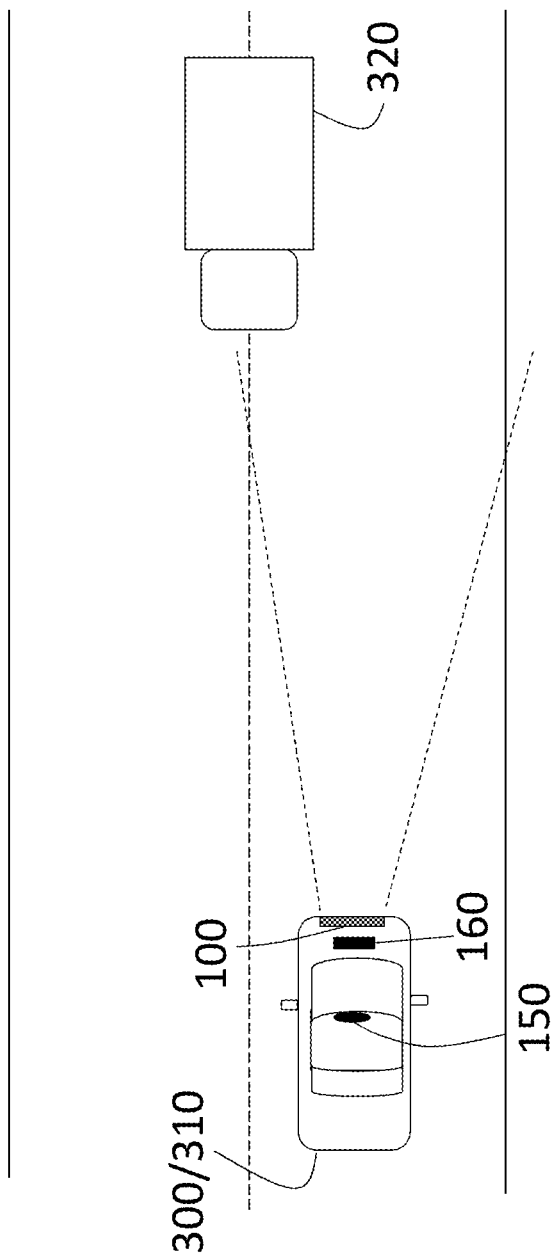
FIG. 3 shows an exemplary platform for embodiments of the system.

FIG. 3 shows an exemplary platform 300 for embodiments of the system 100. The exemplary platform 300 shown in FIG. 3 is a vehicle 310. In alternate embodiments, the platform 300 may be a construction or farm vehicle, or a transport system within an automated manufacturing facility, for example. The vehicle 310 may include other sensors 150 (e.g., camera, lidar system) and a central controller 160 that facilitates providing a warning or control of the vehicle 310 based on information from the system 100. For example, the controller 160 may facilitate obstacle detection and collision avoidance functions that use information from the system 100. As previously noted, the processing of reflections 135 received in the system 100 according to one or more embodiments increases the velocity that is correctly detected. As a result, obstacle detection is enhanced. For example, as noted above, the conventional processing includes latency involved with receiving all of the reflections 135 associated with a frame of transmitted signals 130 (all N reflections 135). This may cause the approaching target 320 to appear as though it is actually moving away from the vehicle 310. Such an error in the processing would prevent proper collision avoidance by the controller 160.

FIG. 4 is a process flow of a method of performing low-latency decoding in a MIMO system 100 according to one or more embodiments. The method may be performed in a platform 300 such as a vehicle 310. At block 410, transmitting from N transmit elements 101 includes transmitting LFM-CW transmit signals with each of the N transmit signals including a different code. Receiving reflections 135 (i.e., symbols), at block 420, includes each receive element 102 receiving the reflections 135 resulting from all of the transmit signals from all of the N transmit elements 101. The number of receive elements 102 may be one, N, or another number. At block 430, processing each symbol S (reflection 135) is according to the processing detailed with reference to FIG. 2. Each received symbol S is processed as it is received (on a symbol-by-symbol basis) rather than waiting for N symbols to be received to process them together. This results in the low-latency decoding, and the low-latency decoding facilitates a higher velocity resolution.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method of performing low-latency decoding in a multi-input multi-output (MIMO) radar system, the method comprising:
    transmitting a different linear frequency-modulated continuous wave (LFM-CW) transmit signal from each of N transmit elements of the MIMO radar system, each transmit signal associated with each of the N transmit elements including a respective code;
    receiving symbols which are reflections associated with each of the transmit signals from each of the N transmit elements at each receive element of the MIMO radar system, wherein each symbol corresponds with each received reflection; and
    processing each symbol on a symbol-by-symbol basis to obtain a respective decoded signal prior to receiving all the symbols corresponding with all the N transmit elements, wherein the processing includes using a Hadamard matrix with N columns in which each column is associated with the respective code transmitted by each of the N transmit elements.

2. method according to claim 1, wherein the processing includes obtaining N processing outputs for each symbol and determining the respective decoded signal from the N processing outputs.

3. The method according to claim 2, wherein the obtaining the N processing outputs is based on multiplying each symbol with each of the N columns of the Hadamard matrix.

4. The method according to claim 2, wherein the determining the respective decoded signal includes comparing the N processing outputs and selecting the respective decoded signal from among the N processing outputs.

5. The method according to claim 1, further comprising determining the transmit element associated with the decoded signal.

6. A multi-input multi-output (MIMO) radar system with low-latency decoding, the system comprising:
    N transmit elements, each of the N transmit elements configured to transmit a different linear frequency-modulated continuous wave (LFM-CW) transmit signal, each transmit signal associated with each of the N transmit elements including a respective code;
    a plurality of receive elements configured to receive symbols which are reflections associated with each of the transmit signals from each of the N transmit elements, wherein each symbol corresponds with each received reflection; and
    a processor configured to obtain a decoded signal corresponding with each reflection, wherein the processor processes each symbol on a symbol-by-symbol basis to obtain a respective decoded signal prior to receiving all the symbols corresponding with all the N transmit elements and the processor processes each symbol using a Hadamard matrix with N columns in which each column is associated with the respective code transmitted by each of the N transmit elements.

7. The system according to claim 6, wherein the processor obtains N processing outputs for each symbol and determines the respective decoded signal from the N processing outputs.

8. The system according to claim 7, wherein the processor obtains the N processing outputs based on multiplying each symbol with each of the N columns of the Hadamard matrix.

9. The system according to claim 7, wherein the processor determines the respective decoded signal based on comparing the N processing outputs and selecting the respective decoded signal from among the N processing outputs.

10. The system according to claim 6, wherein the processor determines the transmit element associated with the decoded signal.

11. The system according to claim 6, wherein the system is integrated in a moving platform.

12. The system according to claim 11, wherein the platform is a vehicle.

* * * * *